(12) United States Patent
Balloul et al.

(10) Patent No.: US 9,211,792 B2
(45) Date of Patent: Dec. 15, 2015

(54) VEHICLE FUEL TANK ARRANGEMENT AND METHOD FOR MANAGING THE SUPPLY OF FUEL TO A VEHICLE

(75) Inventors: Iyad Balloul, Lyons (FR); Jean-Christophe Palmer, St Symphorien d'Oz (FR); Michel Vanvolsem, Montagnieu le Bas (FR)

(73) Assignee: Renault Trucks, St. Priest (FR)

( * ) Notice: Subject to any disclaimer, the term of this patent is extended or adjusted under 35 U.S.C. 154(b) by 0 days.

(21) Appl. No.: 14/360,461

(22) PCT Filed: Dec. 8, 2011

(86) PCT No.: PCT/IB2011/003226
§ 371 (c)(1),
(2), (4) Date: May 23, 2014

(87) PCT Pub. No.: WO2013/084018
PCT Pub. Date: Jun. 13, 2013

(65) Prior Publication Data
US 2014/0318497 A1    Oct. 30, 2014

(51) Int. Cl.
*B60K 15/03* (2006.01)
*B60K 15/077* (2006.01)
*F02M 37/00* (2006.01)
*F02D 19/06* (2006.01)

(52) U.S. Cl.
CPC ......... *B60K 15/03006* (2013.01); *B60K 15/077* (2013.01); *F02D 19/0665* (2013.01); *F02M 37/0088* (2013.01); *B60K 2015/03131* (2013.01); *B60K 2015/03157* (2013.01); *B60K 2015/03355* (2013.01); *Y02T 10/36* (2013.01)

(58) Field of Classification Search
CPC ........... B60K 15/03006; B60K 15/077; B60K 2015/03131; B60K 2015/03157; B60K 2015/03355; F02D 19/0665; F02M 37/0088; Y02T 10/36; F17C 1/00; F17C 3/02; F17B 1/00; F17B 1/10
USPC .................. 123/3, 516; 138/30; 137/259, 255
See application file for complete search history.

(56) References Cited

U.S. PATENT DOCUMENTS 2,432,025 A * 12/1947 Lorenz .......................... 137/590
3,494,509 A *  2/1970 McGuire ................ B65D 88/18
                                                222/107

(Continued)

FOREIGN PATENT DOCUMENTS

| DE | 3147792 A1 | 6/1983 |
| EP | 1041337 A2 | 10/2000 |
| EP | 2199656 A1 | 6/2010 |

OTHER PUBLICATIONS

International Search Report (Feb. 6, 2013) for corresponding International Application PCT/IB2011/003226.

*Primary Examiner* — Marguerite McMahon
*Assistant Examiner* — Tea Holbrook
(74) *Attorney, Agent, or Firm* — WRB-IP LLP

(57) ABSTRACT

A vehicle fuel tank arrangement is provided for a fuel that includes at least a first fluid and a second fluid. The tank arrangement includes a tank and a partition wall arranged inside the tank in order to create at least a first compartment for storing the first fluid and a second compartment for storing the second fluid. The position of the partition all inside the tank can be changed to set the volume of the first compartment and the second compartment to predetermined values.

16 Claims, 2 Drawing Sheets

(56) References Cited

U.S. PATENT DOCUMENTS

| | | | | |
|---|---|---|---|---|
| 3,940,031 A * | 2/1976 | Fishman | | 222/386.5 |
| 5,859,365 A * | 1/1999 | Kataoka | | G01F 23/14 73/149 |
| 5,979,417 A * | 11/1999 | Hyodo | | B60K 15/03 123/516 |
| 6,260,544 B1 * | 7/2001 | Spry | | B60K 15/03504 123/516 |
| 6,389,893 B1 * | 5/2002 | Kobayashi | | G01F 22/00 73/290 B |
| 6,412,476 B1 * | 7/2002 | Thompson | | B60K 15/077 123/516 |
| 6,924,054 B2 * | 8/2005 | Prasad | | B01J 7/02 220/4.12 |
| 7,004,207 B2 * | 2/2006 | Finkelshtain | | H01M 8/04186 141/100 |
| 8,109,286 B2 * | 2/2012 | Nojima | | F17C 11/005 137/255 |
| 2003/0009942 A1 * | 1/2003 | Amendola et al. | | 48/61 |
| 2005/0252489 A1 * | 11/2005 | Moody | | F02D 41/0025 123/435 |
| 2008/0052994 A1 * | 3/2008 | Nojima et al. | | 48/178 |
| 2009/0143934 A1 * | 6/2009 | Motonaga | | B60W 50/14 701/31.4 |

* cited by examiner

VEHICLE FUEL TANK ARRANGEMENT AND METHOD FOR MANAGING THE SUPPLY OF FUEL TO A VEHICLE

BACKGROUND AND SUMMARY

The present invention relates to a vehicle fuel tank arrangement and to a method for managing the supply of fuel to a vehicle engine, said fuel comprising at least a first fluid and a second fluid.

In some cases, it may be advantageous to supply a vehicle engine with a fuel which is a mixture of two or more fluids.

For example, using a dual fuel composed of gasoline and diesel can have positive impacts on the overall consumption or on the engine functioning, especially by reducing knocking and/or by improving ignition.

Since the composition of the optimal fuel changes as a function fit the vehicle operational conditions, it has been proposed not to use a fuel having a predetermined and fixed composition but to create the appropriate mixture depending on said conditions. Therefore, it is known to provide a tank for each fluid which will form part of the fuel supplied to the vehicle engine, and to adapt the fluids ratio in the fuel according to the conditions. Alternatively, there may be provided a single tank including a dedicated compartment for each fluid.

Since the respective quantities of fluids which are consumed depend on the operational conditions, one significant weakness of this implementation is that, most of the time, one of the tanks or compartments may be emptied while at quite large quantity of fluid remains in another tank or compartment. Then, it is necessary to fill the empty compartment whereas it would have been possible to drive for a longer time before filling the other compartment. This results in a more frequent need to refill the vehicle, which is not fully satisfactory for the driver.

Of course, it is theoretically possible to increase the volume of the tanks, but this is in practice not, always possible as the amount of space available on the vehicle is often limited or could be used for other purposes.

It therefore appears that, from several standpoints, there is room for improvement in systems for supplying fuel to a vehicle engine.

It is desirable to provide an improved system and method for managing the supply of fuel—comprising at least a first fluid and a second fluid—to a vehicle engine which can overcome the drawbacks of the prior art.

More precisely, it is desirable to provide such a system and method that make it possible to increase the vehicle autonomy, i.e. to increase the vehicle mileage between two fuel fluids refill, without a significant impact on the required space.

To that end, the invention relates to a vehicle fuel tank arrangement for a fuel comprising at least a first fluid and a second fluid, the tank arrangement comprising:
  a tank;
  a partition wall arranged inside the tank in order to create at least a first compartment for storing the first fluid and a second compartment for storing the second fluid.

Such vehicle fuel tank arrangement is characterized in that the position of the partition wall inside the tank can be changed to set the volume of the first compartment, respectively the second compartment, to a predetermined value.

The system may further comprise an actuator which is coupled to the partition wall and which is capable of changing the position of the partition wall inside the tank to set the volume of the first compartment, respectively the second compartment, to a predetermined value.

Having a partition wall which can be appropriately positioned, the storage arrangement and system according to the invention make it possible to optimize the respective amounts of the various fluids contained in the tank, and therefore to increase the vehicle autonomy for a given volume of the tank.

In concrete terms, the position of the partition wall can be predetermined depending on the coming vehicle operational conditions, which can be estimated. The partition watt is then positioned accordingly, as a function of predictable data, typically at least one operational parameter.

At the next service station, the driver will only have to fill up the compartments at their maximum with the appropriate fluids. The volumes of the first and the second fluids when the tank is refilled are set by the position of the partition wall. Said position is not necessarily changed until the next stop for refilling one of the compartments. During this period, the ratio of the fluids in the fuel preferably corresponds to the volume ratio in the tank. Indeed, the volume ratio is set based on an estimation of fluid depletion ratio in the compartments. The fluid depletion ratio can be fixed during the period, meaning that the engine is operating with a fuel mixture having the same composition, but, alternatively it can vary during that period to adapt to the engine operation to the vehicle operational conditions at a given time. In the latter case, the fluid depletion ratio estimation is preferably an estimation of the mean ratio for the period until next refill.

The term "position" can both refer to the shape of the partition wall—which is a feature of the partition wall itself and/or to the location of said partition wall—this feature relating to the partition wall with respect to the tank.

According to a second aspect, the invention concerns a method for managing the supply of fuel to a vehicle engine, said method comprising:
  providing an arrangement as previously described;—predicting the respective consumptions of the fluids contained in the fuel, based on at least one operational parameter;
  before the compartments are refilled, changing the position of the partition wall according to said prediction.

Optimally, the position for the partition wall is set so that the respective volumes of the fluids in the compartments fall below a minimum threshold substantially at the same time.

By loading the right ratio of fluids, the vehicle autonomy is increased for a given total volume of fluids. Indeed, the number of times the driver needs to stop to fill-up the compartments is reduced, so the time period or distance between two refilling is increased.

The phrase at the same time does not mean exactly simultaneously, but at moments that are close, so as to minimize the period of time when one compartment is nearly empty while the other one still contains enough fluid to supply to the vehicle engine. For example, it can be envisaged that when the volume of one compartment drops below a minimum threshold, then the volume of the other compartment(s) is not more than 10% above the corresponding minimum threshold.

The minimum threshold may be expressed as a percentage of the volume of the compartment for the current setting of the partition wall position. Alternatively, it could be expressed as a certain quantity of remaining fluid in the relevant compartment. The threshold could vary depending on the volume of the compartment for the current setting of the partition wall position.

The minimum threshold, i.e. the predetermined value when a refill is needed or will soon be needed, generally generates a signal for the vehicle driver. The minimum threshold may be different for each compartment, and may generate its own signal for the driver.

These and other features and advantages will become apparent upon reading the following description in view of the drawing attached hereto representing, as non-limiting examples, embodiments of an arrangement according to the invention.

BRIEF DESCRIPTION OF THE DRAWINGS

The following detailed description of several embodiments of the invention is better understood when read in conjunction with the appended drawings, it being however understood that the invention is not limited to the specific embodiments disclosed.

DETAILED DESCRIPTION

Figure 1:
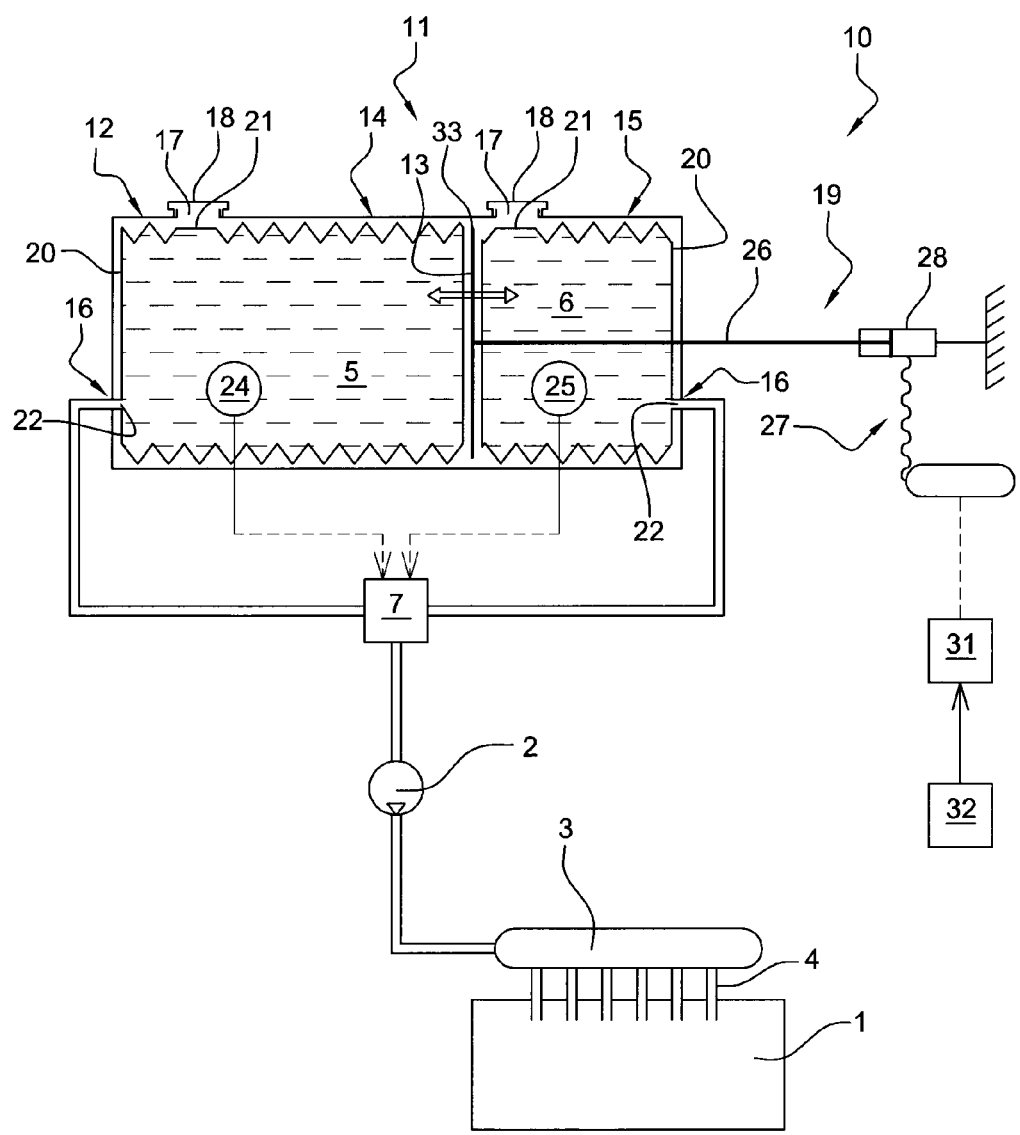
FIG. 1 is a schematic representation of a system for managing the supply of fuel to a vehicle engine according to a first embodiment of the invention.

In the context of the invention, a vehicle engine 1 is supplied with fuel, typically by means of a pump 2, a common rail 3 and injectors 4. The fuel to be injected in the engine cylinders, directly or indirectly, comprises at least a first fluid 5 and a second fluid 6 which, in this example, can be mixed in a mixing device 7 upstream from the pump 2. Alternatively, the system may be equipped with specific flow paths for each fluid, possibly up to the engine cylinders. For example, the system could be provided with separate pumping means, and possibly with separate pressurized fluid accumulators (such as so-called common-rails and possibly with separate fluid injectors for injecting the corresponding fluid in the cylinder or in an intake manifold, etc. . . .

The invention will be described considering that the fuel is composed of two fluids. However, the invention is not limited to this embodiment, and the fuel could be composed of more than two fluids.

In practice, the first fluid 5 can comprise a lust fuel and the second fluid 6 can comprise a second fuel and/or an additive and/or a depolluting agent. Examples of additives include octane or hexadecane, while a depolluting agent can include urea.

In an implementation, the first fluid 5 can comprise gasoline, ethanol, or a mixture thereof. As regards the second fluid 6, it can comprise diesel.

The system 10 includes a storage arrangement or tank arrangement 11 for the fuel.

The tank arrangement 11 comprises a tank 12 and a partition wall 13 arranged inside the tank 12 in order to create at least a first compartment 14 for storing the first fluid 5 and a second compartment 15 for storing the second fluid 6. The tank comprises an enclosure having peripheral walls which defines an internal volume. The tank is preferably of fixed geometry so that the internal volume is preferably fixed. Each compartment defines a volume which is delimited by the partition wall and by the corresponding portions of the tank enclosure peripheral walls.

Each compartment 14, 15 is designed to contain one fluid 5, 6, and is preferably substantially leak free, so that the fluids are not mixed in the tank 12. Each compartment 14, 15 can be provided with an outlet 16 for the corresponding fluid 5, 6 to be pumped towards the vehicle engine 1, for example through the mixing device 7 and the pump 2. Besides, each compartment 14, 15 preferably comprises an inlet 17 for being refilled. The inlets 17 may be closed by a cap 18.

According to the invention, the position of the partition wall 13 inside the tank 12 can be changed to set the volume of the first compartment 14, respectively the second compartment 15, to a predetermined value.

The change in position of the partition wall results in a change of the volume ratio of both compartments, i.e. changes the ratio between the volume of each compartment compared to the total volume of the tank. The aim is not necessarily to be able to cover the full 0 to 100% range of volume ratio for a given compartment. Rather, it is for example interesting to vary the volume ratio for a given compartment from 40% to 80% or from 20% to 50%. Nevertheless, the possible change in position of the partition wall should cover a range such that the resulting volume ratio of the compartments would change by at least 10 percentage points, i.e. that the volume ratio of a compartment should be able to be set between 10 and 20% or between 25 and 35% or between 45 and 55% of the tank volume. Preferably, the possible change in position of the partition wall should cover a range such that the resulting, volume ratio of the compartments would change by at least 20 percentage points, such as allowing a compartment to have its volume ratio vary between for example 25 and 45% of the tank volume. Within such a range, the possibility to change the volume ratio could be continuous, incremental at discrete levels, or only limited to the limits of the range, in the latter case, the partition wall would only be able to occupy two positions.

The system 10 may further comprise an actuator 19 which can be coupled to the partition wall 13 and which can be capable of changing the position of the partition wall 13 inside the tank 12 to set the volume of the first compartment 14, respectively the volume of the second compartment 15, to a predetermined value.

In order to provide or improve sealing between the compartments 14, 15, the storage arrangement 11 can further comprise a flexible bag 20 located inside at least one of the compartments 14, 15 and designed to contain the corresponding fluid. Because of its flexibility, the bag 20 can adopt the shape and the volume of the compartment as defined by the position of the partition wall 13. Such a bag 20 can include one inlet 21 for the refill, and one outlet 22 for the fluid to be pumped towards the engine 1.

According to a preferred embodiment, both compartments are equipped with such a flexible bag 20. If such is the case, the partition wall does not need to be fluid tight. It can that be formed of a perforated plate or of a lattice.

In case the first fluid 5 comprises gasoline, ethanol, or a mixture thereof and the second fluid 6 comprises diesel, the volume of the first compartment 14 can typically range from 40% to 80% of the volume of the tank 12, depending on the position of the partition will 13. For example, in such a context, if it is planned that the vehicle is to be used mainly for delivering goods at various locations in a city, the system can be set so as to define in the tank a first compartment representing approximately 75% of the volume of the tank for holding gasoline and a second compartment representing approximately 25% of the volume of the tank for holding, diesel. On the other hand, if the same vehicle is planned to be used mainly on mountain roads, the system can be set so as to define two compartments of substantially equal volume.

Preferably, the first and second compartments 14, 15 can be equipped with a sensor 24, 25 from which it can be derived the amount of fluid remaining in each compartment. The sensors 24, 25 are capable of generating separate alerts when the amount of fluid in the corresponding compartment 14, 15 falls below a certain threshold. The minimum volume thresholds can be different from one compartment to the other.

The actuator 19 can comprise a moving member 26, such as a lever, fastened to a portion of the partition wall 13 and driving means 27 capable of moving the moving member 26 in order to change the position of the partition wall 13 inside the tank 12.

The driving means 27 can be powered by an hydraulic, electric or mechanical energy source. In the first and second embodiments shown in FIGS. 1 and 2 respectively, the driving means 27 comprise a hydraulic device such as a hydraulic jack 28. In the third embodiment shown in FIG. 3, the driving means 27 comprise a motor 29, typically an electric motor, and a mechanical transmission 30 with the moving member 26. However, this is only described by way of an example.

Furthermore, there may be provided a controller 31 capable of controlling the actuator 19 according to at least one operational, parameter, but preferably according to a combination of several operational parameters. More precisely, the controller 31 may be able to control the driving means 27 of the actuator 19.

The operational parameter(s) can be chosen among the following non limitative list:
  the type of route on which the vehicle is expected to travel, for example: motorway, mountain road, worksite, city, etc.;
  the type of activity connected to the particular trip, for example: long-haul, delivery in a city, etc.;
  specific regulations applicable during the trip;
  the vehicle load;
  a desired comprise between vehicle performance, fuel consumption and toxic emissions;
  the traffic;
  weather conditions;
  the respective costs of the fluids contained in the fuel in a certain geographical zone;
  the availability of the fluids contained in the fuel, in a certain geographical zone.

In concrete terms, on the basis of at least one operational parameter corresponding to the vehicle operating conditions to come, it is determined what fuel composition would be optimal and therefore what will be a probable ratio of use of the different fluids forming the fuel. Therefore, the respective consumptions of the fluids 5, 6 contained in the fuel can be predicted. Then, before the compartments 14, 15 are refilled, the position of the partition wall 13 can be changed according to said prediction. As a result, if the vehicle operates as predicted, the respective volumes of the fluids 5, 6 in the compartments 14, 15 will fall below a minimum threshold substantially at the same time.

According, to an implementation of the invention, the controller 31 can be operated manually. For example, the controller 31 can comprise an input device for the driver, such as a touche screen or a knob. On the basis of the operational parameter(s) predicted by the driver or by an appropriate electronic device 32, the driver may decide to act on the controller 31. This results in changing the position of the partition wall 13, i.e. changing the respective maximum volumes of the fluids which can be filled in the tank. Basically, it is then up to the driver or to another operator to make an estimation or to obtain an estimation (for example from a computer system) on the ratio of depletion of fluids along the trip to come, and to set the position of the partition wall accordingly.

According to another implementation, the controller 31 can be operated automatically. To this end, the system 10 can comprise an electronic device 32 capable of receiving, calculating and/or predicting at least one operational parameter and capable of operating the controller 31.

The electronic device 32, which can be used to operate the controller 31 either automatically or manually, can comprise a GPS (global positioning system). The GPS can be connected to a database containing data such as the location, the traffic, the type of roads on which the vehicle will drive during an upcoming trip (motorway, highway, city, etc.). Said GPS can further be connected to a database containing information related to the location of the vehicle (such as the country), and the availability of the fluids 5, 6 contained in the fuel in said location. Such systems are now more and more combined into so-called navigations systems where it is possible to select a destination point and where the best route to said destination is calculated according to various priorities. Along each route, a model based calculation can be performed to determine an estimation of various parameters such as average speed, time to destination, fuel consumption, etc . . . and it would therefore be easily accessible to the man in the art to provide tables and/or algorithms for estimating the ratio of depletion of each fluid in the fuel composition along that route.

For example, if the GPS has located the vehicle in an area where the average fuel consumption is estimated around 20%±5% diesel and 80%±5% gasoline, the partition wall 13 can be positioned, by the controller 31 and actuator 19, so that the compartment containing the diesel has a volume of 20% of the tank. volume. Said positioning is made before the driver fills the tank 12 at the next service station. There, the driver only will have to fill up both compartments at their maximum.

In some cases, it can be provided that the ratio of fluids 5, 6 in the fuel supplied to the vehicle engine 1 remains the same during the time period before two refills, said ratio corresponding to the volume ratio of fluids in the tank 12. In such a case, the ratio can be determined at the same time and in the same way both when it comes to determining the composition of fuel to be delivered to the engine and when it comes to determining the position of the partition wall in the tank. However, in most cases, it will be preferable to be able to adapt very frequently during a trip between two refills, preferably in real time, the most effective composition of the fuel which is it to be injected in the engine cylinders. In such a case, the use of the system according to the invention relies on an estimation of the mean ratio of fluids which will be depleted along the trip following the next refill. This estimation should preferably cover the period between the next refill and the subsequent refill.

However, according to another implementation of the invention which can be combined with the implementations already described, a method for managing the supply of fuel to a vehicle engine could additionally comprise:
  monitoring the remaining volume of fluid in each compartment;
  in case one fluid volume has fallen below a predetermined threshold, altering the ratio of fluids in the fuel supplied to the vehicle engine.

It has to be understood that last step can be taken without necessarily changing the position of the partition wall 13 inside the tank 12. This last step would typically occur during a trip if the fluid depletion ratio estimation which was made for that trip, and according to which the partition wall position has been set, proves to be inaccurate. By altering the ratio of fluids in the fuel supplied to the vehicle engine, it is meant that the effective ratio of fluids in the fuel composition is set at a value different from an optimal value which would have been set if the respective remaining quantities of fluids had been correct.

Having information about the remaining volume of first fluid 5 and second fluid 6, by means of sensors 24, 25, the system 10 makes it possible to estimate the amount of remaining kilometres the vehicle can go. If one of both fluids falls below a critical quantity level, the injection ratio of fluids can be altered, to increase the amount of kilometres the vehicle can still cover. This can correspond to a degraded mode working of the engine, typically at reduced torque level.

For example, the degraded mode can have three alert levels:
- a first alert when one of the fluid levels is too low, where the driveability of the vehicle is maintained;
- a second alert for which one parameter can be degraded such as the torque level);
- and a third level which can be a critical mode, where, for instance, there is no air conditioning, or no regeneration of the diesel particulate filter, or where is implemented a different combustion strategy possibly increasing the release of undesirable substances in exhaust gases, or where the maximal speed is limited to 40 km/h, etc.

A GPS combined with access to relevant database can alert the driver for the best service station to stop at, for each of those alert levels.

Reference is now made to FIG. 1 which shows a first embodiment of the invention.

In this embodiment, the partition wall 13 can be substantially rigid and can be moved inside the tank 12. In other words, the partition wall 13 can resist the deformation stresses, and its shape remains substantially unchanged during normal operating conditions. However, the partition wall 13 is displaceable altogether inside the tank.

For example, the partition wall 13 can comprise a plate, for example a metal plate. This plate can be arranged substantially transversally to the tank 12, thereby defining compartments 14, 15 on both sides. There may be provided a sealing means (not shown) at the periphery 33 of the partition wall 13, in order to prevent fluid links between compartments 14, 15. Alternatively or additionally, flexible bags 20 as previously described can be used to contain the fluids 5, 6.

The actuator 19 can be provided to move the partition wall 13 inside the tank 12. The moving member 26 can comprise a lever fastened to the partition wall 13, for example substantially at its centre, and being the plunger rod of a hydraulic jack 28.

Figure 2:
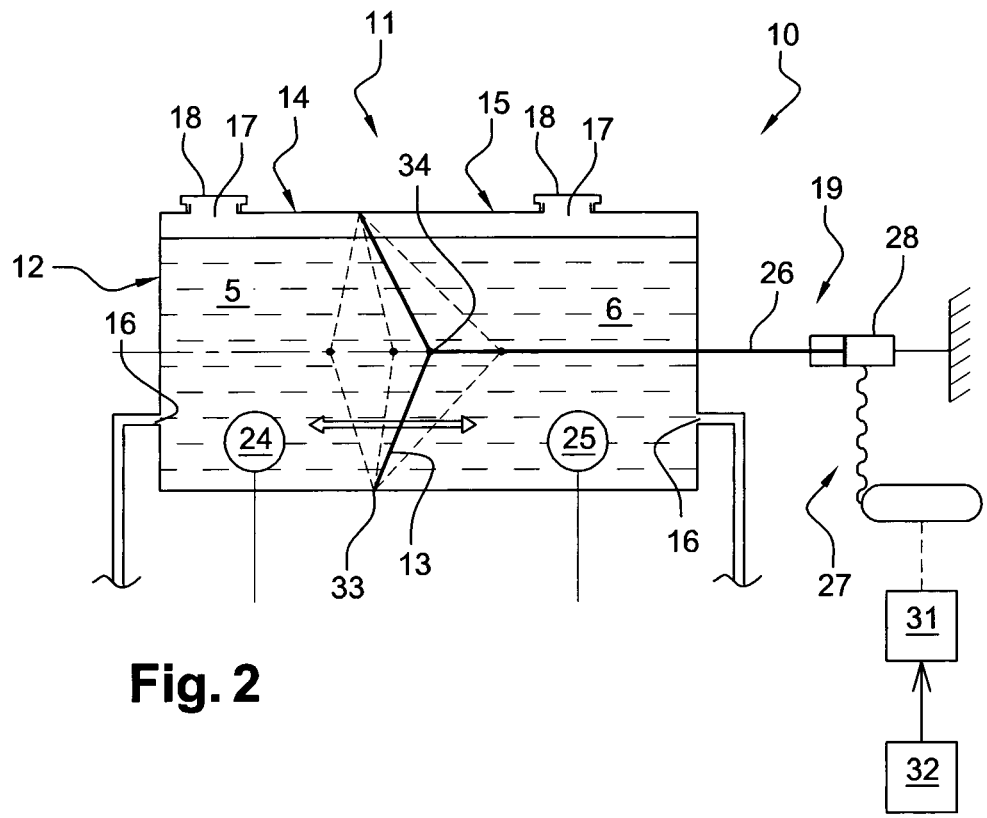
FIG. 2 is a schematic and partial representation of such a system according to a second embodiment of the invention.

According to a second embodiment shown in FIG. 2, the partition wall 13 can have a resistance to deformation which is:
- sufficiently low to make it possible for the actuator 19 to deform the partition wall 13;
- and sufficiently high to prevent the partition wall 13 from being substantially deformed by either fluid 5, 6 introduced or contained in a compartment 14, 5 of the tank 12.

In other words, in this embodiment, the partition wall 13 is deformable. But such a deformation is only possible by means of the actuator 19, not by the stress caused by either fluid 5, 6 (for example its pressure or its weight).

For example, the partition wall 13 can comprise a plate, for example a metal plate, which can be pre-stressed. In the embodiment shown in FIG. 2, this plate can be arranged substantially transversally to the tank 12, thereby defining compartments 14, 15 on both sides. The periphery 33 of the partition wall 13 can be fixed with respect to the tank 12, preferably with a sealing means. Flexible bags 20 could also be provided. The partition wall 13 further has at least one movable area 34 close to its centre.

As regards the moving member 26, it can comprise a lever fastened to the partition wall 13, preferably in the movable area thereof. The lever can be the plunger rod of a hydraulic jack 28.

Moving the moving member 26 results in pulling or pushing the movable area 34, thereby deforming the partition wall 13 towards a V shape, as shown in FIG. 2. As a consequence, the volume of one compartment 14 is increased while the volume of the other compartment 15 is reduced accordingly.

Figure 3:
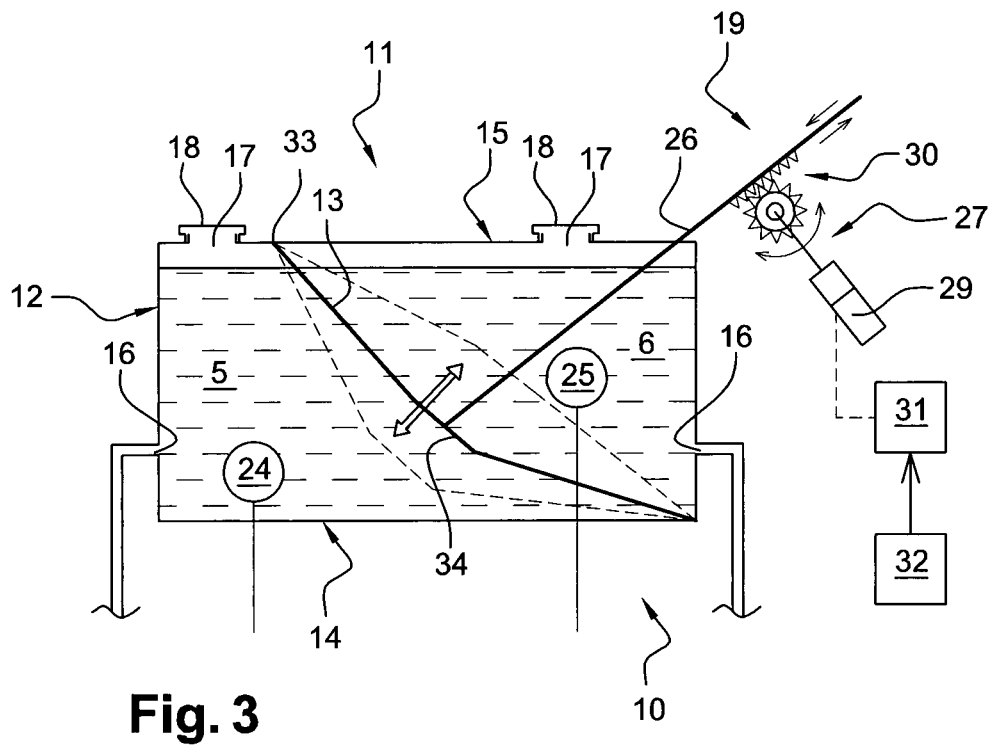
FIG. 3 is a schematic and partial representation of such a system according to a third embodiment of the invention.

In a third embodiment shown in FIG. 3, the partition wall 13 can be deformable as previously described. It can for example comprise a plate, such as a metal plate, which can be pre-stressed.

As shown in FIG. 3, this plate can be arranged in a slanted manner between substantially diagonally opposite locations of the tank 12, and extend over the whole section of the tank 12 so as to define compartments 14, 15. The periphery 31 of the partition wall 13 can be fixed with respect to the tank 12, preferably with a sealing means. Flexible bags 20 could also be provided. The partition wall 13 further has at least one movable area 34, preferably close to its centre.

As regards the moving member 26, it can comprise a lever fastened to the partition wall 13, preferably in the movable area thereof. The movement of the lever can be caused by an electric motor 29 and the appropriate mechanical transmission 30. Alternatively, the lever could be the plunger rod of a hydraulic jack.

Moving the moving member 26 results in pulling, or pushing the movable area 34, thereby deforming the partition wall 13 into a broken line, for example a V. As a consequence, the volume of one compartment 14 is increased while the volume of the other compartment 15 is reduced accordingly.

In the embodiments of FIGS. 2 and 3, the partition wall can comprise a plate like assembly comprising several plate-like members which are connected to each other so as to overlap and slide/tilt with respect one to the other so as to allow a substantial deformation of the wall.

Of course, the invention is not restricted to the embodiments described above by way of non-limiting examples, but on the contrary it encompasses all embodiments thereof.

The invention claimed is:

1. A vehicle fuel tank arrangement for a fuel comprising at least a first fluid and a second fluid, the tank arrangement comprising:
   a tank; and
   a partition wall arranged inside the tank in order to create at least a first compartment t for storing the first fluid and a second compartment for storing the second fluid;
   wherein the position of the partition wall inside the tank can be changed to set the volume of the first compartment, respectively the second compartment, to a predetermined value;
   wherein the vehicle fuel tank arrangement comprises an actuator which is coupled to the partition wall and which is arranged to change a position of the partition wall inside the tank to set a volume of the first compartment and a volume of the second compartment to predetermined values that are predetermined according to predicted consumptions of the first and second fluids.

2. The vehicle fuel tank arrangement according to claim 1, wherein the actuator comprises a moving member fastened to a portion of the partition wall and driving means capable of moving the moving member in order to change the position of the partition wall inside the tank.

3. The vehicle fuel tank arrangement according to claim 1, wherein the partition wall is substantially rigid and can be moved inside the tank.

4. The vehicle fuel tank arrangement according to claim 1, wherein the partition wall has a resistance to deformation which is sufficiently low to make it possible for the actuator to deform the partition wall, and sufficiently high to prevent the partition wall from being substantially deformed by either fluid introduced or contained in a compartment of the tank.

5. The vehicle fuel tank arrangement according to claim 1, wherein the respective consumptions of the first and second fluids are predicted according to at least one vehicle operational parameter.

6. The vehicle fuel tank arrangement according to claim 5, wherein the at least one vehicle operational parameter is chosen among:
- a type of route on which the vehicle is expected to travel;
- a type of activity connected to the particular trip;
- specific regulations applicable during the trip
- a vehicle load
- a desired comprise between vehicle performance, fuel consumption and toxic emissions the traffic;
- weather conditions;
- respective costs of the fluids contained in the fuel in a certain geographical zone;
- availability of the fluids contained in the fuel, in a certain geographical zone.

7. The vehicle fuel tank arrangement according to claim 5, comprising an electronic device capable of receiving, calculating or predicting said at least one operational parameter.

8. The system according to claim 7, wherein the electronic device comprises a GPS (global positioning system).

9. The vehicle fuel tank arrangement according to claim 1, wherein the first fluid comprises a first fuel and the second fluid comprises a second fuel and/or an additive and/or a depolluting agent.

10. The vehicle fuel tank arrangement according to claim 1, wherein the first fluid comprises gasoline, ethanol, or a mixture thereof.

11. The vehicle fuel tank arrangement according to claim 1, wherein the second fluid comprises diesel.

12. The vehicle fuel tank arrangement according to claim 1, wherein the volume of the first compartment ranges from 40% to 80% of the volume of the tank, depending on the position of the partition wall.

13. The vehicle fuel tank arrangement according to claim 1, wherein the fuel tank arrangement further comprises a flexible bag located inside at least one of the compartments and designed to contain the corresponding fluid.

14. A method for managing the supply of fuel to a vehicle engine, the method comprising:
- providing a vehicle fuel tank arrangement for a fuel comprising at least a first fluid and a second fluid, the tank arrangement comprising;
- a tank: and
- a partition wall arranged inside the tank in order to create at least a first compartment for storing the first fluid and a second compartment for storing the second fluid;
- wherein the position of the partition wall inside the tank can be change to set the volume of the first compartment, respectively the second compartment, to a predetermined value;
- wherein the vehicle fuel tank arrangement comprises an actuator which is coupled to the partition wall and which is arranged to chance a position of the partition wall inside the tank to set a volume of the first compartment and a volume of the second compartment to predetermined values that are predetermined according to predicted consumptions of the first and second fluids,
- predicting respective consumptions of the fluids contained in the fuel tank, based on at least one operational parameter, and
- before the compartments are refilled, changing the position of the partition wall according to the prediction.

15. Method according to claim 14, wherein the position of the partition wall is set so that volumes of fluids in first and second compartments fall below a minimum threshold substantially at the same time.

16. The method according to claims 14, further comprising
- monitoring a remaining volume of fluid in each compartment; and
- altering a ratio of fluids in the fuel supplied to the vehicle engine when one fluid volume falls below a predetermined threshold.

* * * * *